(12) United States Patent
Chen

(10) Patent No.: US 8,208,206 B2
(45) Date of Patent: Jun. 26, 2012

(54) SUPERZOOM LENSES

(75) Inventor: Ming-Chung Chen, Changhua (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 13/023,709

(22) Filed: Feb. 9, 2011

(65) Prior Publication Data
US 2011/0194192 A1    Aug. 11, 2011

(30) Foreign Application Priority Data

Feb. 10, 2010  (TW) ............................... 99104138 A

(51) Int. Cl.
*G02B 15/14* (2006.01)
(52) U.S. Cl. ...................................................... 359/687
(58) Field of Classification Search .................. 359/683, 359/687
See application file for complete search history.

(56) References Cited

U.S. PATENT DOCUMENTS

2006/0268425 A1* 11/2006 Chang ........................... 359/676
2007/0229968 A1* 10/2007 Satori et al. .................... 359/676

* cited by examiner

*Primary Examiner* — Scott J Sugarman
(74) *Attorney, Agent, or Firm* — Thomas, Kayden, Horstemeyer & Risley, LLP

(57) ABSTRACT

Superzoom lenses are disclosed. The superzoom lenses include, in order from an object side to an image side on an optical axis, a first lens group, a second lens group, an aperture, a third lens group, and a fourth lens group. The first lens group has positive optical power. The second lens group has negative optical power and is consisted of a convex lens and a concave lens. The third lens group has positive optical power. The fourth lens group has positive optical power. The superzoom lenses satisfy the following relationship when the superzoom lenses are collapsed:

$3 \leq L_W/ID < 5$ wherein $L_W$ stands for the optical path length, and ID stands for the diameter of the image circle.

4 Claims, 5 Drawing Sheets

SUPERZOOM LENSES

RELATED APPLICATIONS

The application claims priority to Taiwan Application Serial Number 99104138, filed Feb. 10, 2010, which is herein incorporated by reference.

BACKGROUND

1. Technical Field

The present disclosure relates to zoom lenses. More particularly, the present disclosure relates to superzoom lenses.

2. Description of Related Art

One kind of zoom lenses, disclosed in U.S. Pat. No. 7,420,745, includes a first lens group, a second lens group, an aperture, a third lens group, and a fourth lens group arranged from an object side to an image side on an optical axis for a digital camera, a digital video camera, or a personal digital assistant (PDA).

The first lens group has positive optical power. The second lens group has negative optical power. The third lens group has positive optical power. The fourth lens group with positive optical power. The first lens group moves toward the object side when the zoom lenses are extended.

Furthermore, the second lens group includes a negative lens, a positive lens, and a negative lens arranged from the object side to the image side on an optical axis. The positive lens and the negative lens located close to the image side are cemented together.

As mentioned above, the second lens group has at least three lenses. Therefore, the thickness of the zoom lenses is increased when the zoom lenses is collapsed.

SUMMARY

According to one embodiment of the present disclosure, superzoom lenses include, in order from an object side to an image side on an optical axis, a first lens group, a second lens group, an aperture, a third lens group, and a fourth lens group. The first lens group has positive optical power. The second lens group has negative optical power and is consisted of a convex lens and a concave lens. The third lens group has positive optical power. The fourth lens group has positive optical power. The superzoom lenses satisfy the following relationship when the superzoom lenses are collapsed:

$$3 \leq L_W/ID < 5$$

wherein $L_W$ stands for the optical path length, and ID stands for the diameter of the image circle.

Therefore, the second lens of the superzoom lenses is thinned because the second lens group is consisted of two lenses. Furthermore, the superzoom lenses satisfy the relationship $3 \leq L_W/ID < 5$ for maintaining the optical performance of the superzoom lenses.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
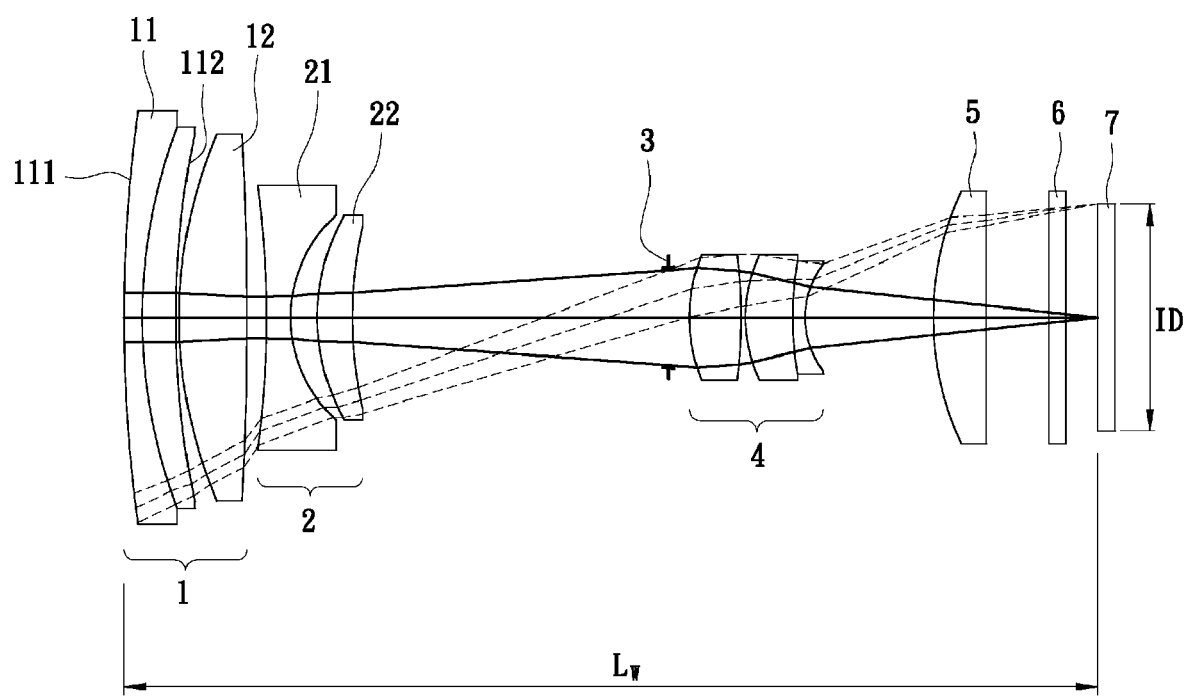
FIG. 1 is a plan view of superzoom lenses according to one embodiment of the present disclosure.
Figure 2:
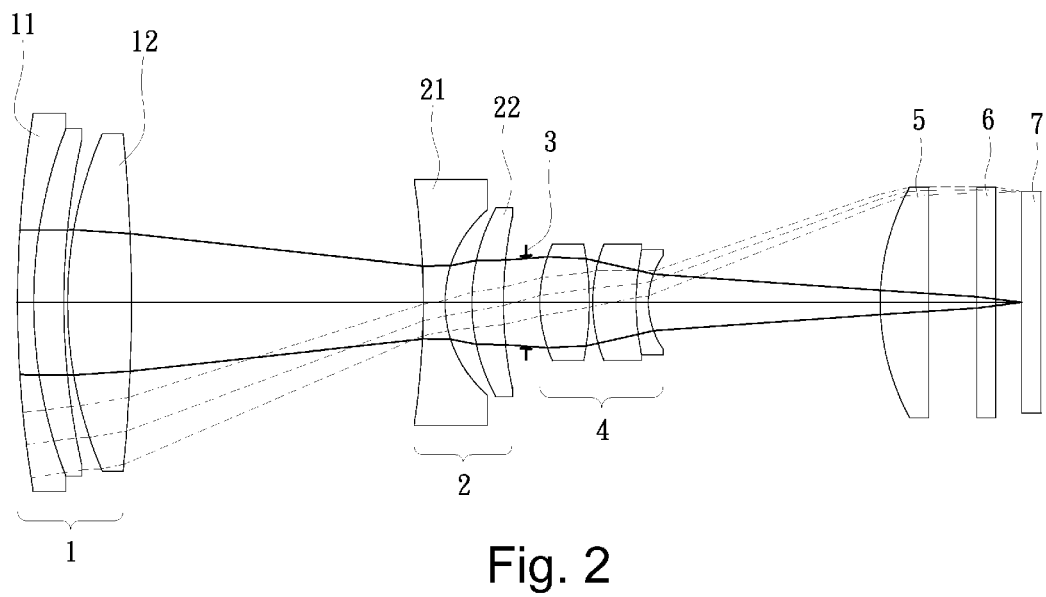
FIG. 2 illustrates the superzoom lenses of FIG. 1 in one operating mode.

FIG. 1 is a plan view of superzoom lenses according to one embodiment of the present disclosure. The superzoom lenses include, in order from an object side to an image side on an optical axis, a first lens group 1, a second lens group 2, an aperture 3, a third lens group 4, and a fourth lens group 5. The first lens group 1 has positive optical power. The second lens group 2 has negative optical power and is consisted of a convex lens 22 and a concave lens 21. The third lens group 4 has positive optical power. The fourth lens group 5 has positive optical power. The superzoom lenses satisfy the following relationship when the superzoom lenses are collapsed:

$$3 \leq L_W/ID < 5$$

wherein $L_W$ stands for the optical path length, and ID stands for the diameter of the image circle.

The term "superzoom" means that the zoom lenses have unconventionally large focal length factors, typically more than 4× and ranging up to 15×, e.g., 35 mm to 350 mm.

The first lens group 1 collects the light. The third lens group 4 and the fourth lens group 5 compensate for any movement of the focal plane to keep the focused image sharp when the magnification of the superzoom lenses is changed.

Therefore, the second lens of the superzoom lenses is thinned because the second lens group 2 is consisted of two lenses. Furthermore, the superzoom lenses satisfy the relationship $3 \leq L_W/ID < 5$ for maintaining the optical performance of the superzoom lenses. The diameter of the image circle is too large to feature high zoom ratios and good optical performance when $L_W/ID < 3$. On the contrary, the optical path length is too large to thin the superzoom lenses when $L_W/ID > 5$.

In detail, the light from the object side passes through the superzoom lenses and a cover glass 6, and the light is sensed by an image sensor 7, such as charge-coupled device (CCD) or complementary metal-oxide-semiconductor (CMOS). The superzoom lenses can be extended or collapsed for changing the magnification. The first lens group 1 moves toward the object side and the distance between the second lens group 2 and the third lens group 4 is decreased, when the superzoom lenses are extended.

The first lens group 1 is consisted of a negative meniscus lens 11 and a convex lens 12. The negative meniscus lens 11 has good aberration correction and is easily processed. Furthermore, the convex surface 111 of the negative meniscus lens 11 faces toward the object side, and the concave surface 112 of the negative meniscus lens 11 faces toward the image side for increasing the angle of view of the superzoom lenses, when the superzoom lenses are extended.

The convex lens 22 of the second lens group 2 is disposed near the image side. The concave lens 21 of the second lens group 2 is disposed near the object side. In detail, the concave lens 21 is a biconcave lens. The concave lens 21 is a positive meniscus lens.

The superzoom lenses satisfiy the following relationship:

$$f_T/f_W \geq 4.5$$

wherein $f_W$ stands for the focal length when the superzoom lenses are collapsed, and $f_T$ stands for the focal length when the superzoom lenses are extended. Therefore, the zoom ratio of the superzoom lenses is larger than 4.5.

Figures 3A, 3B:
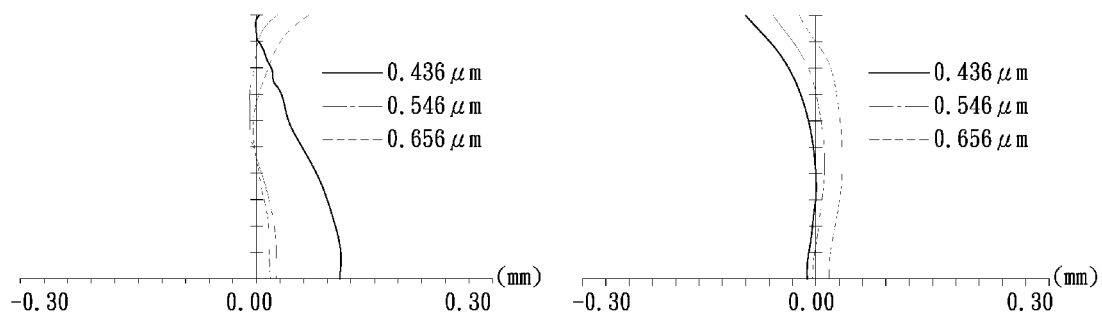
FIG. 3A shows spherical aberration curves of the superzoom lenses shown in FIG. 1 in one operating mode.
FIG. 3B shows spherical aberration curves of the superzoom lenses shown in FIG. 1 in another operating mode.

FIG. 3A shows spherical aberration curves of the superzoom lenses shown in FIG. 1 in one operating mode, when the superzoom lenses are collapsed. The spherical aberration means that the rays refracted by a real lens are focused more tightly than the rays refracted by a perfect lens. Therefore, the real lens does not produce a perfect focal point. The horizontal axis is the deviation of the focal point of the ray. The vertical axis is the distance between the ray and the optic axis. Furthermore, FIG. 3A depicts three spherical aberrations of three lights with different wavelength, 0.436, 0.546, and 0.656 μm. FIG. 3B shows spherical aberration curves of the superzoom lenses shown in FIG. 1 in another operating mode, when the superzoom lenses are extended. As mentioned above, the spherical aberration of the superzoom lenses is slight.

Figure 4A:
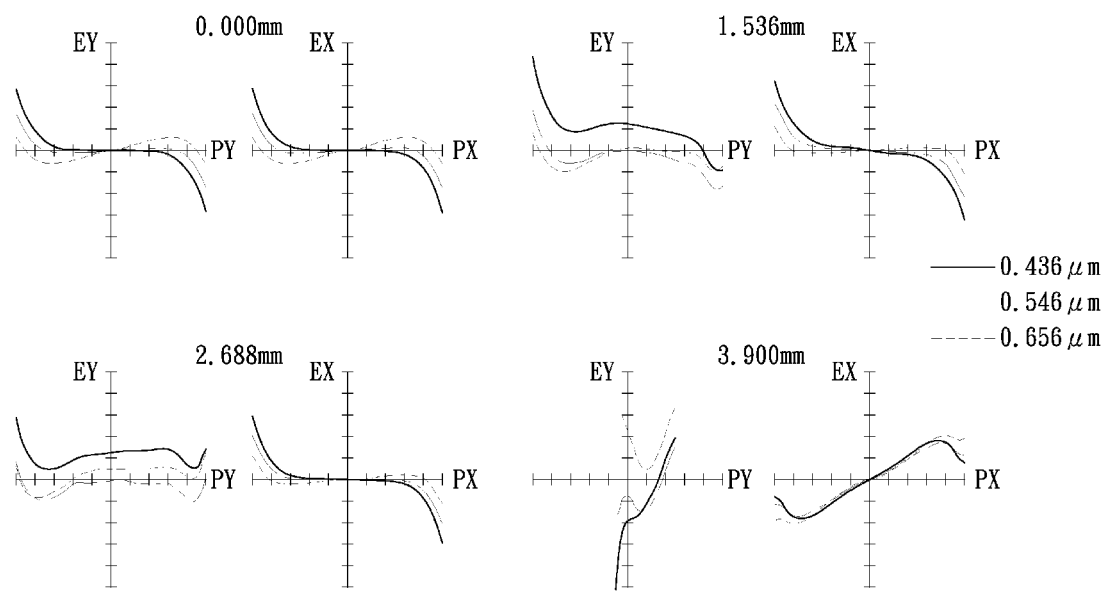
FIG. 4A shows coma aberration curves of the superzoom lenses shown in FIG. 1 in one operating mode.
Figure 4B:
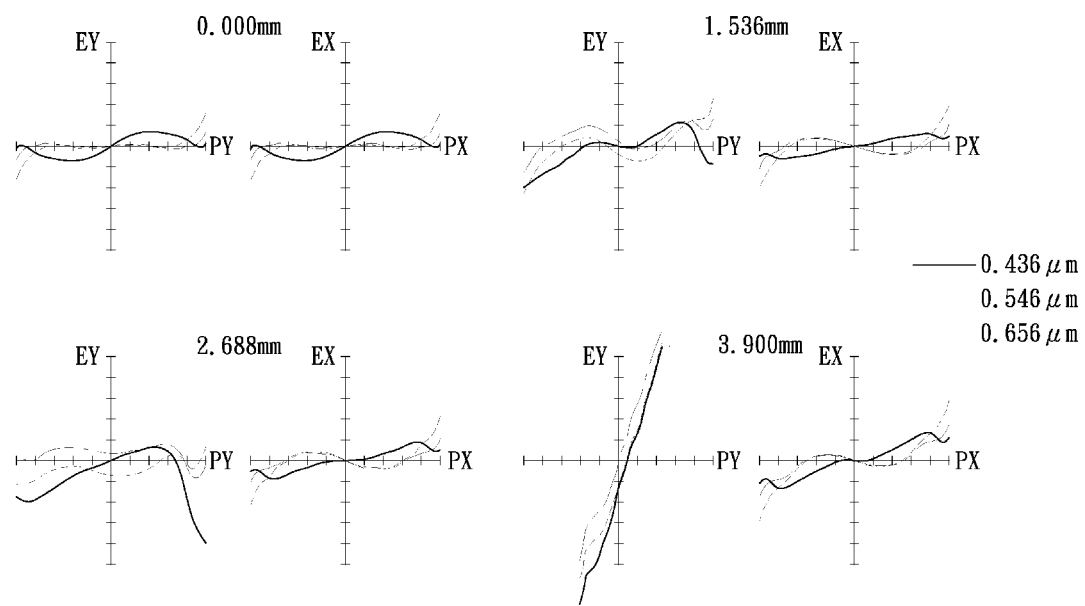
FIG. 4B shows coma aberration curves of the superzoom lenses shown in FIG. 1 in another operating mode.

FIG. 4A shows coma aberration curves of the superzoom lenses shown in FIG. 1 in one operating mode, when the superzoom lenses are collapsed. The coma aberration means that the different parts of a lens do not reflect light to the same point when the light is off-center. The coma aberrations are obtained at the respective image heights of 0.000, 1.536, 2.688, and 3.900 mm. Each coma aberration is depicted in a tangential plane, PY and EY, and a sagittal plane, PX and EX. FIG. 4B shows coma aberration curves of the superzoom lenses shown in FIG. 1 in another operating mode, when the superzoom lenses are extended. As mentioned above, the variation in magnification by the coma aberration is slight.

Therefore, the second lens of the superzoom lenses is thinned because the second lens group 2 is consisted of two lenses. Furthermore, the superzoom lenses satisfy the relationship $3 \leq L_W/ID < 5$ for maintaining the optical performance of the superzoom lenses.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, 6th paragraph. In particular, the use of "step of" in the claims is not intended to invoke the provisions of 35 U.S.C. §112, 6th paragraph.

What is claimed is:

1. Superzoom lenses comprising, in order from an object side to an image side on an optical axis:
    a first lens group with positive optical power;
    a second lens group with negative optical power consisted of a convex lens and a concave lens;
    an aperture;
    a third lens group with positive optical power; and
    a fourth lens group with positive optical power;
    wherein the superzoom lenses satisfy the following relationship when the superzoom lenses are collapsed:

$$3 \leq L_W/ID < 5$$

wherein $L_W$ stands for the optical path length, and ID stands for the diameter of the image circle.

2. The superzoom lenses of claim 1, wherein the first lens group is consisted of a negative meniscus lens and a convex lens.

3. The superzoom lenses of claim 1, wherein the superzoom lenses satisfy the following relationship:

$$f_T/f_W \geq 4.5$$

wherein $f_W$ stands for the focal length when the superzoom lenses are collapsed, and the $f_T$ stands for the focal length when the superzoom lenses are extended.

4. The superzoom lenses of claim 1, wherein the first lens group moves toward the object side and a distance between the second lens group and the third lens group is decreased, while the superzoom lenses are extended.

* * * * *